United States Patent [19]

Reynolds, III

[11] 4,007,896
[45] Feb. 15, 1977

[54] UPWARDLY EXTENDIBLE WING FLAP SYSTEM

[76] Inventor: Collins J. Reynolds, III, 1615 Krameria St., Denver, Colo. 80220

[22] Filed: Aug. 8, 1975

[21] Appl. No.: 603,246

[52] U.S. Cl. .............................. 244/42 D; 244/113; 244/130

[51] Int. Cl.$^2$ ......................................... B64C 9/18

[58] Field of Search ............ 244/42 D, 42 DA, 113, 244/42 R, 130, 42 CB, 42 DB, 42 DC, 43, 44

[56] References Cited

UNITED STATES PATENTS

| 1,846,146 | 2/1932 | Rocheville | 244/44 |
| 2,076,150 | 4/1937 | Klein | 244/42 DC |
| 2,152,835 | 4/1939 | Bolas | 244/42 D |
| 2,275,777 | 3/1942 | Lane et al. | 244/43 |
| 2,317,267 | 4/1943 | Gazda | 244/43 |
| 2,549,760 | 4/1951 | Adams | 244/42 D |
| 3,827,657 | 8/1974 | Schwarzler | 244/42 DA |

FOREIGN PATENTS OR APPLICATIONS

| 715,266 | 11/1941 | Germany | 244/42 DB |
| 577,779 | 5/1946 | United Kingdom | 244/42 DA |
| 728,515 | 4/1955 | United Kingdom | 244/42 DA |
| 266,148 | 2/1927 | United Kingdom | 244/43 |

Primary Examiner—Trygve M. Blix
Assistant Examiner—Galen L. Barefoot
Attorney, Agent, or Firm—Clarence A. O'Brien; Harvey B. Jacobson

[57] ABSTRACT

A fixed wing is provided and includes an upwardly opening recess formed therein and extending along the trailing marginal edge portions of the wing. A flap is provided and mounted from the wing for shifting relative thereto between a first lower retracted limit position at least substantially fully received in the recess, and an elevated position displaced upwardly above the upper surface of the wing with the flap disposed at an angle of attack greater than the angle of attack of the wing. A closure panel is mounted in the recess below the flap for upward movement to a closed position at least substantially closing the recess at the upper portion thereof upon upward movement of the flap to its elevated position and the portion of the wing defining the forward portion of the recess in which the flap is receivable includes a trailing flexible flap member which overlies the forward edge of the flap when the latter is in the closed position and pass which the leading edge of the flap is movable, as a result of deflection of the flap member, upon movement of the flap back and forth between the retracted and elevated positions thereof.

6 Claims, 8 Drawing Figures

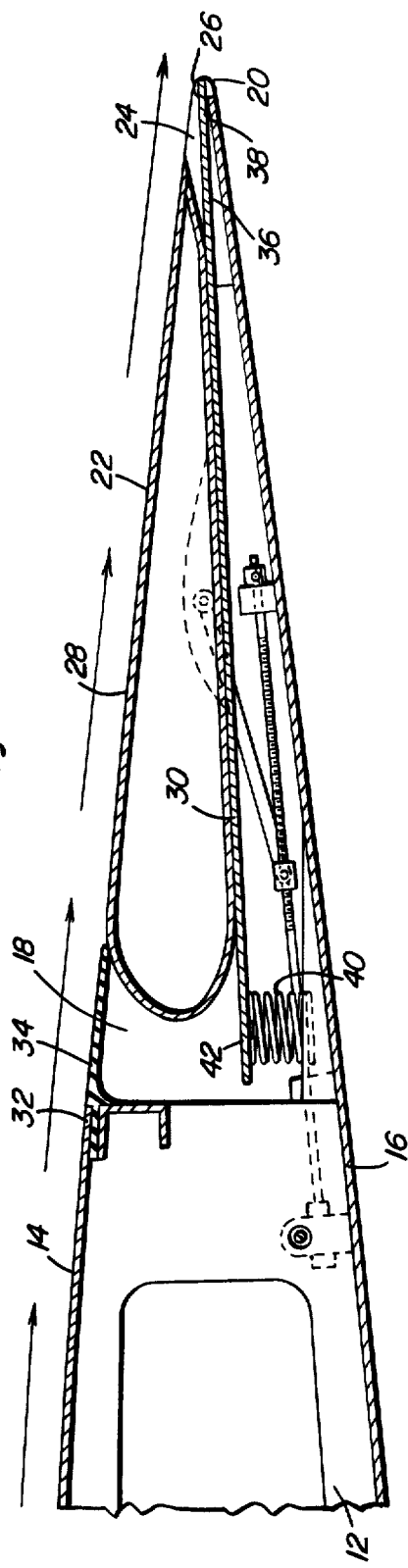
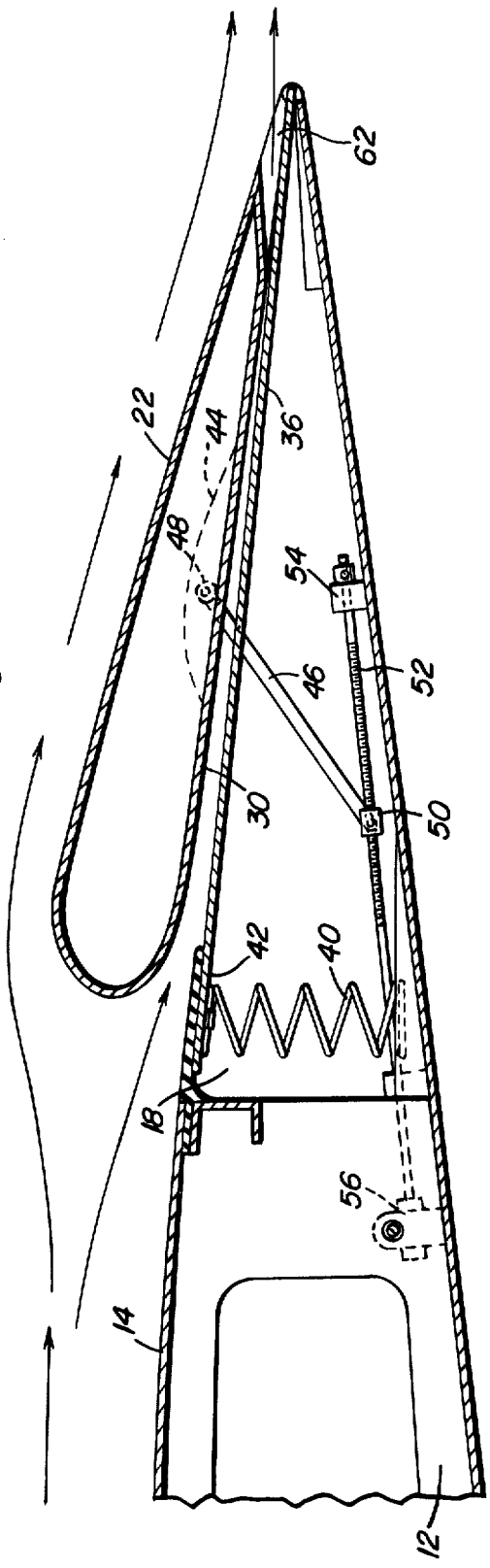

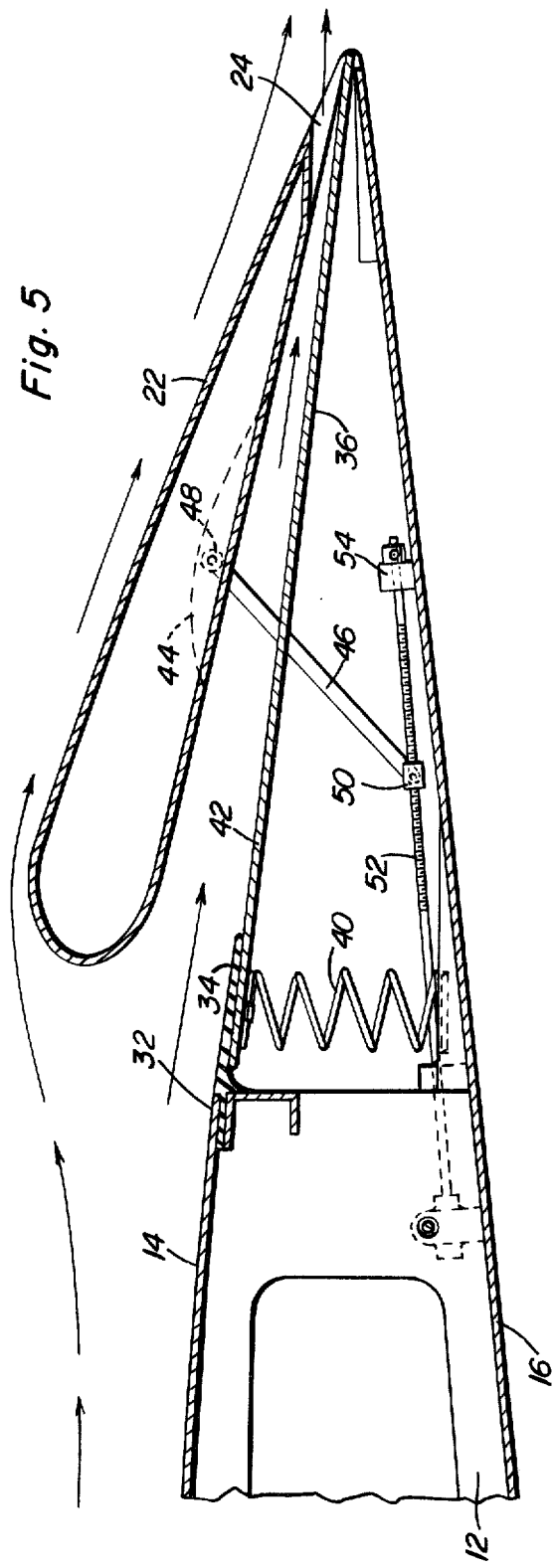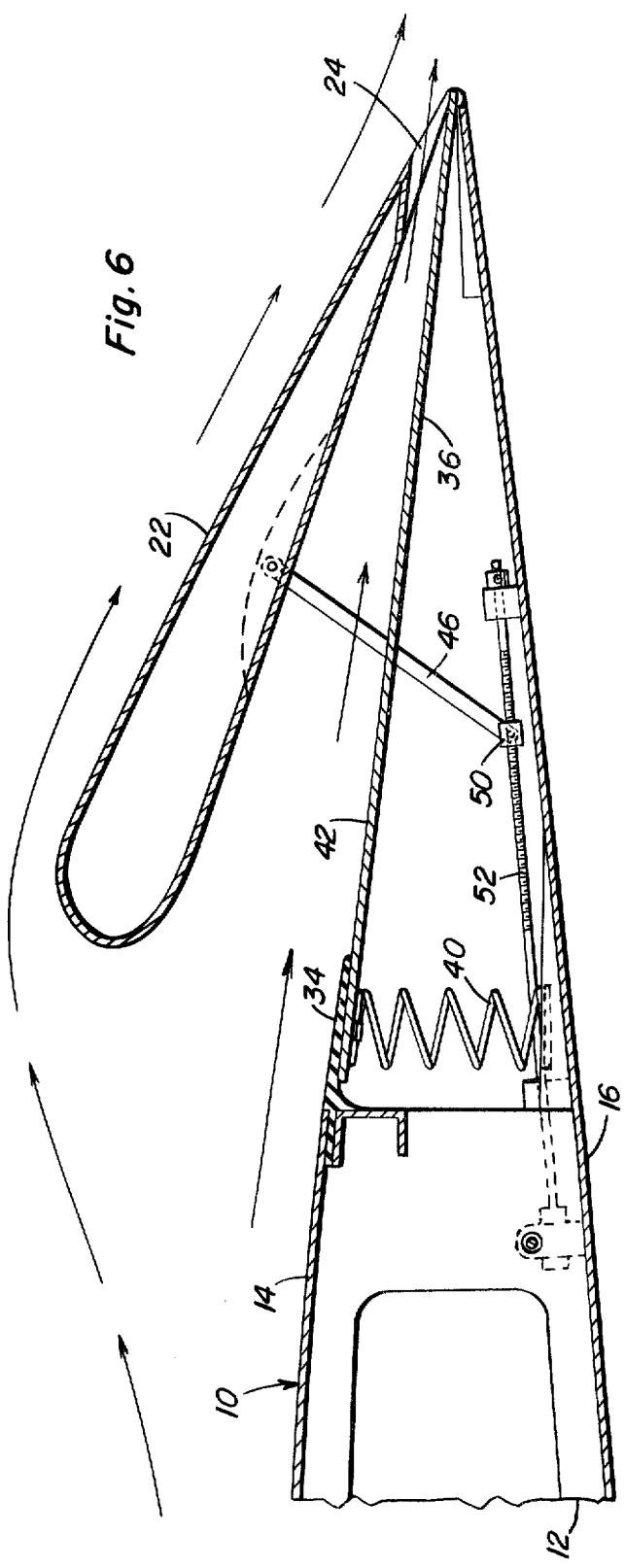

4,007,896

UPWARDLY EXTENDIBLE WING FLAP SYSTEM

BACKGROUND OF THE INVENTION

Current aircraft practice in high lift devices has standardized on wing leading edge slats and slots, and wing trailing edge flaps of the fixed hinge or Fowler flap variety. The most advanced of these high lift systems combine both leading and trailing edge devices which can change both the camber and chord of the associated wing. The least advanced devices are found on private aircraft and are usually confined to single unit trailing edge flaps with fixed hinge points.

Most advanced and least advanced trailing edge flaps operate in airflow below the wing. However, airflow above the wing is critical in the prevention of stalls and there has been much experimentation in the boundary layer bleed approach, but little practical application.

Examples of various forms of wing flap constructions are disclosed in U.S. Pat. Nos. 2,289,704, 2,549,760, 2,852,211, 3,184,186, 3,260,477, 3,586,267, 3,706,431 and 3,827,657.

BRIEF DESCRIPTION OF THE INVENTION

The flap system of the instant invention may be constructed so as to be of conventional size and located at the trailing edges of the wings. Further, the flap area may equal from 5 to 10 percent of the fixed wing area and the flaps have an aspect ratio of from 1:10 to 1:20 and flap air-foil sections have "conventional" high lift cross-sections. When retracted, the flap of the instant invention conforms to the upper wing contours and when extended above the adjacent fixed wing portions includes a closure panel which closes the upper portion of the wing recess in which the flap is received when it is fully retracted, the closure panel conforming to the upper surface of the adjacent fixed wing portions when in the closed position.

The wing flap of the instant invention is unlike conventional trailing edge flap systems which are extended downwardly below the fixed wing and require heavy extension forces and light retraction forces. The wing flap of the instant invention and the elevating structure therefor is constructed in a manner whereby the angle of attack of the flap may be varied.

The main object of this invention is to provide a high lift wing flap construction capable of being deployed in an upward direction in relation to the wing chord for operation in potentially stalled airflow and in a manner to form a venturi between the flap and the adjacent fixed wing upper surfaces.

Another object of this invention is to provide a wing flap which may be deployed in order to increase both lift and drag as well as wing area but without increasing the effective wing chord.

Still another important object of this invention is to provide a wing flap system operable above the supportive fixed wing and in a manner to speed and smooth potentially turbulent air at the fixed wing's initial stalled generation location while producing lift of its own in relatively smooth flowing air.

Another very important object of this invention is to provide a flap system which may be used, if desired, in conjunction with conventional forms of slats, slots and conventional flaps.

A final object of this invention to be specifically enumerated herein is to provide an upwardly extendible wing flap system in accordance with the preceding objects and which will conform to conventional forms of manufacture, be of simple construction and dependable in operation so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is an enlarged fragmentary vertical sectional view taken substantially upon the plane indicated by the section line 3—3 of FIG. 2 and with the flap system in a fully retracted position;

FIG. 4 is a vertical sectional view similar to FIG. 3 but with the flap of the flap system in a lower deployed position;

FIGS. 5 and 6 are fragmentary sectional views similar to FIGS. 3 and 4 but with the flap in intermediate and fully upwardly displaced deployed positions;

DETAILED DESCRIPTION OF THE INVENTION

Figure 1:
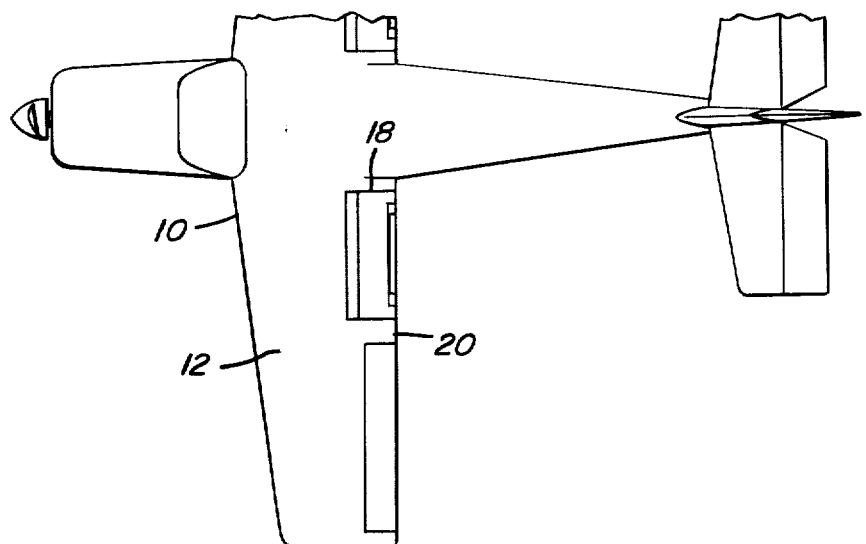
FIG. 1 is a fragmentary top plan view of a fixed wing aircraft equipped with the upwardly extendible wing flap system of the instant invention.
Figure 2:
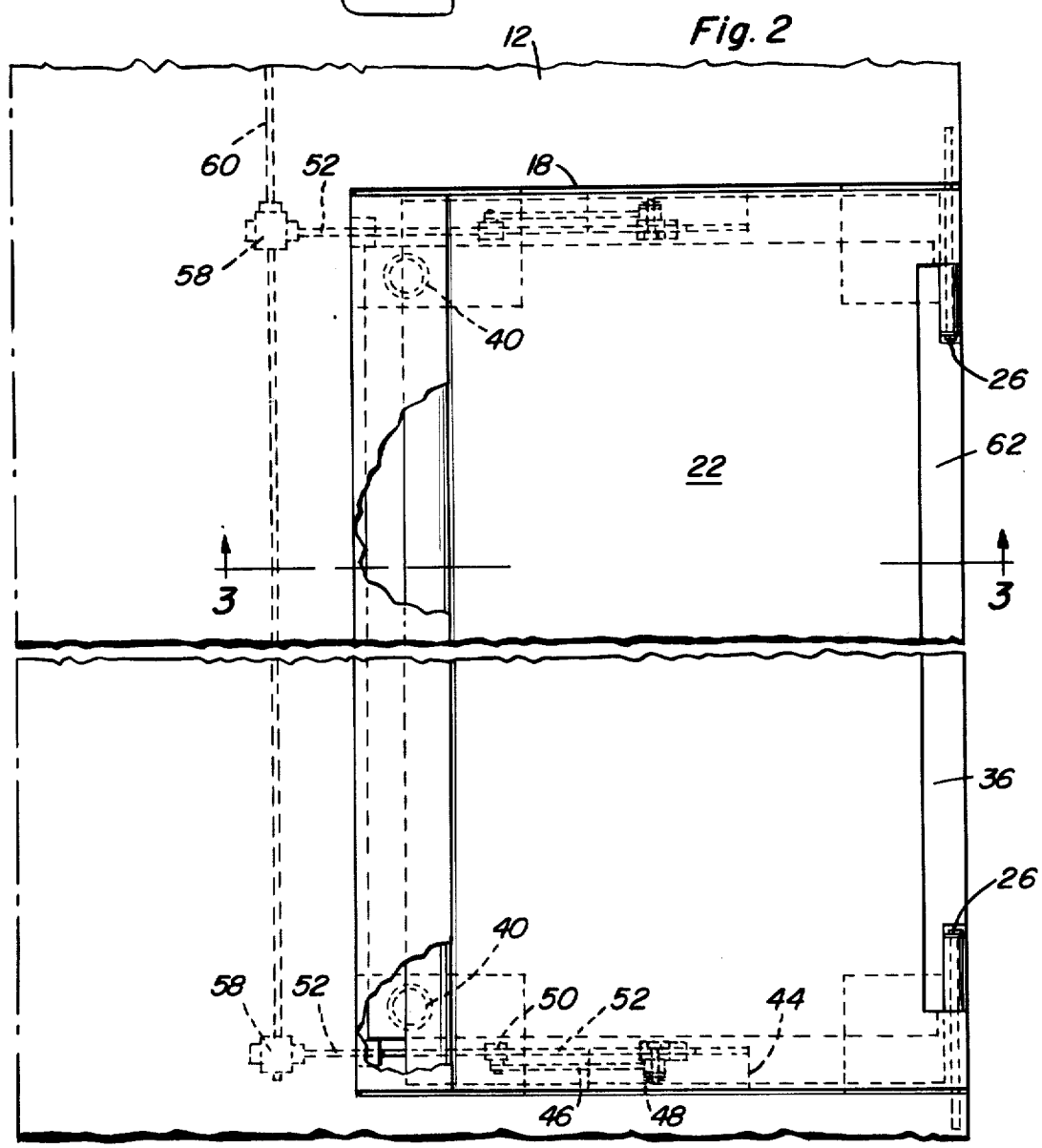
FIG. 2 is an enlarged fragmentary plan view of the left wing portion of the aircraft illustrated in FIG. 1 from which the flap system of the instant invention is supported.

Referring now more specifically to the drawings, the numeral 10 generally designates a conventional form of light aircraft including a fixed wing 12 having upper and lower surfaces 14 and 16. The wing 12 has an upwardly opening recess 18 formed therein closely adjacent the trailing edge 20 and the recess 18 opens upwardly through the upper surface 14.

A foil shaped flap 22 is received within the recess 18 and has its trailing edge portion 24 pivotally supported from the trailing edge 20, as at 26, the flap 22 including upper and lower surfaces 28 and 30.

The portion 32 of the upper surface 14 defining the forward extremity of the recess 18 has the forward edge of a flexible flap member 34 supported therefrom and the rear edge portion of the flap member 34 overlies the forward extremity of the upper surface 28 of the flap 22 when the latter is fully received within the recess 18. It may be seen from FIG. 3 of the drawings that the upper surface 14, the flap 34 and the upper surface 28 of the flap 22 are substantially coextensive.

Mounted within the recess 18 below the flap 22 is a closure panel 36 having its trailing edge portion 38 also pivotally supported from the trailing edge 20 of the wing 12, as at 26. A pair of compression springs 40 are disposed beneath opposite ends of the forward marginal edge portion of the closure panel 36 and yieldingly bias the latter upwardly toward a position with the forward marginal edge 42 of the closure panel 36 closely underlying the flap member 34 with opposite end portions (not shown) of the panel 36 abutting adjacent undersurface portions of the upper surface or skin of the wing.

The opposite ends of the flap 22 are provided with downwardly opening smoothly contoured recesses 44 in which the upper ends of a pair of actuating links 46 are pivotally anchored, as at 48. The lower ends of the links 46 are pivotally attached to threaded nuts 50 threadedly engaged on jack screws 52 journaled within the wing 12, as at 54 and 56. The forward ends of the jack screws 52 are driven from right angle gear boxes 58 to which rotational torque is supplied from a motor driven drive shaft 60 journaled through the gear boxes 58, the inboard ends of the shaft 60 being driven by any suitable motor means within the fuselage of the aircraft 10.

The cover or closure panel 36 is retained in a fully retracted position by the flap 22 when the latter is its fully retracted position illustrated in FIG. 3. However, upon simultaneous rotation of the jack screws 52, the nuts 50 may move rearwardly along the jack screws 52 from the positions thereof illustrated in FIG. 3 of the drawings to the positions thereof illustrated in FIG. 4 whereby the flap 22 will be slightly elevated above the upper surface 14 of the wing 12. Of course, the closure panel 36 is automatically spring biased upwardly to the upper limit position thereof illustrated in FIG. 4 closely underlying the flap 22 and closing the upper extremity of the recess 18. Upon movement of the flap 22 from the fully retracted position to the initially extended position illustrated in FIG. 4, the leading edge portion of the flap 22 deflects the flexible flap member 34 and moves upwardly therepast after which the flexible flap member 34 again returns to the generally planar trailing position closely overlying the leading edge portion 42 of the closure panel 36. Further, the trailing edge portion 24 of the flap 22 includes an airflow slot 62 extending therealong whereby air passing between the flap 22 and closure panel 36 may exit from the trailing edge 20 of the wing 12.

After the flap 22 has been initially deployed as a result of its upward displacement to the position thereof illustrated in FIG. 4, the flap 22 may be further upwardly displaced to an intermediate position thereof such as that illustrated in FIG. 5 and subsequently further elevated to the fully deployed position thereof illustrated in FIG. 6. Of course, as upward displacement of the flap 22 is increased from the position thereof illustrated in FIG. 4, the angle of attack of the flap 22 increases.

When it is desired to retract the flap 22, rotation of the jack screws 52 in the opposite direction is effected and the nuts 50 thereby move forwardly along the jack screws 52 in order to retract the flap 22 back downwardly into engagement with the closure panel 36 and subsequently downwardly pass the trailing edge portion of the flap member 34 and into the fully recessed position illustrated in FIG. 3 with the closure panel 36 being forced downwardly against the biasing action of the spring 40 by movement of the flap 22 to its fully retracted position.

Figure 7:
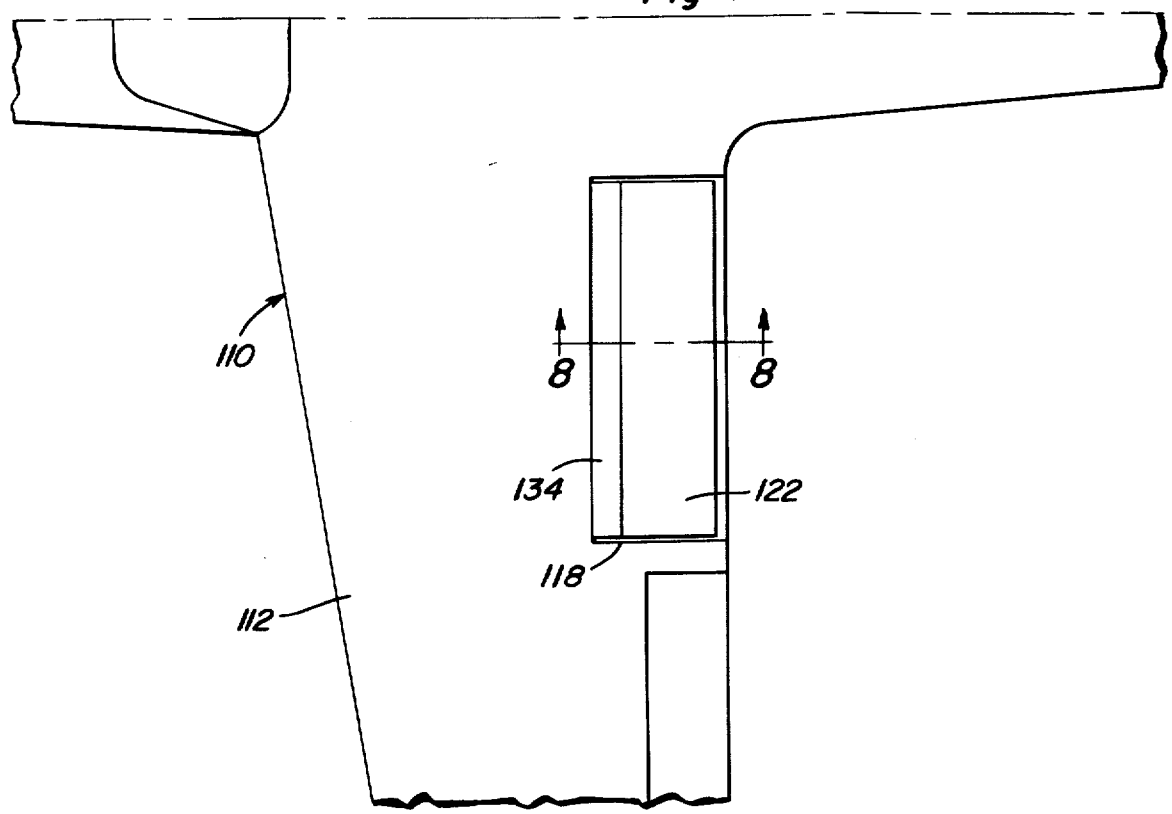
FIG. 7 is a fragmentary top plan view of an aircraft equipped with a second form of the flap system constructed in accordance with the present invention.

With attention now invited more specifically to FIG. 7 of the drawings, there may be seen a second aircraft referred to in general by the reference numeral 110 and including a wing 112. The wing 112 includes upper and lower surfaces 114 and 116 as well as an upwardly opening recess 118 formed therein corresponding to the recess 18. In addition, the wing 112 includes a closure panel 136 for the upper portion of the recess 118 and a pair of opposite end coil springs 140 are provided to yieldingly upwardly displace the closure panel 136 to its fully closed position with its forward marginal edge portion 142 underlying a flap member 134 corresponding to the flap member 34.

The wing 112 includes a flap 122 corresponding to the flap 22. However, the rear or trailing edge portion 124 of the flap 122 is not pivotally secured to the trailing edge 120 of the wing 112. Rather, a pair of scissors jack constructions referred to in general by the reference numerals 146 are provided at the opposite ends of the flap 122 and are connected between the bottom of the recess 118 and the under surface 130 of the flap 122. The scissors jacks 146 include jack screws 152 having oppositely threaded opposite end portions 153 and 155 with which suitably threaded nuts 157 and 159 are threadedly engaged and the jack screws 152 each may be driven by a universally equipped lengthwise extendible drive shaft 161 driven from right angle drive assemblies 158 corresponding to the drive assemblies 58.

Figure 8:
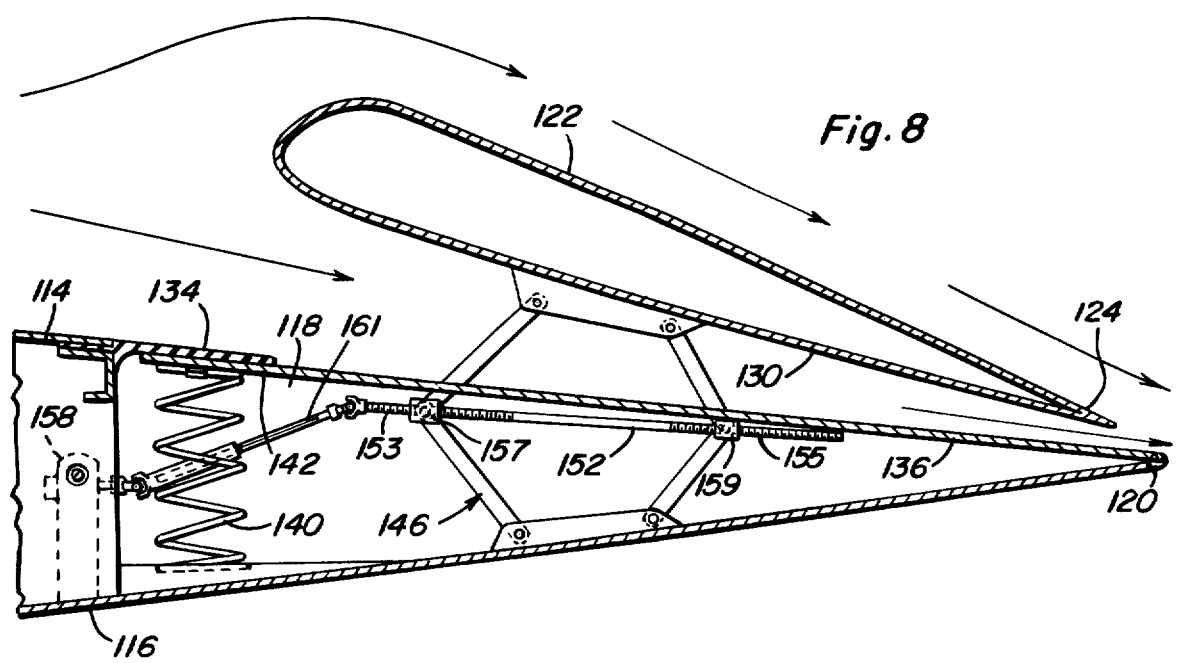
FIG. 8 is a fragmentary vertical sectional view taken substantially upon the plane indicated by the section line 8—8 of FIG. 7 and illustrating the modified form flap system with its flap member in a fully upwardly displaced position.

From FIG. 8 of the drawings it may be appreciated that the jack screws 152 may be rotated in order to cause the flap 122 to shift from the fully extended position thereof illustrated in FIG. 8 (corresponding to the fully extended position of the flap 22 illustrated in FIG. 6) to a fully retracted position within the recess 118 corresponding to the fully retracted position of the flap 22 illustrated in FIG. 3. The pitch of the threaded ends 153 and 155 of the jack screw 152 is reversed and may be different in order that the angle of attack of the flap 22 will constantly decrease during lowering of the flap 122 into the recess 118 in much the same manner in which the angle of attack of the flap 22 is decreased upon the flap 22 being lowered into the recess 18. Accordingly, it will be appreciated that the operation of the flap 122 is substantially identical to the operation of the flap 22, except that the rear trailing edge 124 of the flap 122 is free of direct connection with the wing 12 and spaced above the closure panel 136 at all times when the flap 122 is elevated to a position above the position thereof corresponding to the position of the flap 22 illustrated in FIG. 4.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a wing including leading and trailing marginal edge portions and upper and lower surfaces, the trailing marginal edge portion of said wing including a recess formed therein opening upwardly through said upper surface of and extending along said trailing marginal edge portion, a flap including leading and trailing edges, mounting means mounting said flap from said wing for guided shifting relative thereto along an upstanding path between a first lower retracted limit position at least substantially fully received in said recess, a second fully raised limit position upwardly displaced above said upper surface and with said flap disposed at a substantially greater angle of attack than said wing and a third partially raised somewhat lower intermediate extended position between said limit positions with said flap disposed only slightly above said upper surface and at an angle of attack greater than said wing but less than the first mentioned angle of attack, said flap including upper and lower surfaces, said flap upper surface constituting a substantial closure for the upper portion of said recess when said flap is in its lower limit position, a closure panel mounted in said recess below said flap for guided upward following movement behind said flap to an upper closed limit position at least substantially closing said recess at the upper portion thereof upon upward movement of said flap from said first position thereof to at least said third intermediate position thereof, said closure panel including a forward marginal edge portion, the portion of said wing defining the upper forward portion of said recess including a trailing flexible flap member which overlies the leading edge of said flap when the latter is in the closed position and past which the leading edge of said flap is movable, as a result of deflection of said flap member, upon movement of said flap back and forth between said first and third positions thereof, said flap member overlying the forward marginal edge portion of said closure panel when said closure panel is in the closed position thereof.

2. The combination of claim 1 wherein said mounting means comprises scissor jack means mounted in a lower portion of said recess and operatively connected to said flap.

3. The combination of claim 2 wherein said scissors jack means includes means operative to elevate and lower the leading edge of said flap at a faster rate than the trailing edge of said jack.

4. The combination of claim 1 wherein said mounting means includes a pivot connection between the trailing edge portion of said flap and the trailing edge portion of said wing and jack means connected between said wing and said flap forward of said pivot connection.

5. The combination of claim 4 wherein the trailing edge of said flap includes air slots formed therethrough.

6. The combination of claim 1 wherein the rear marginal portion of said closure panel is hingedly supported from the trailing edge portion of said wing, spring means operatively connected between said wing and said panel yieldingly biasing said panel toward said closed position.

* * * * *